(No Model.) 2 Sheets—Sheet 1.
G. STITES.
FILTER.
No. 572,136. Patented Dec. 1, 1896.
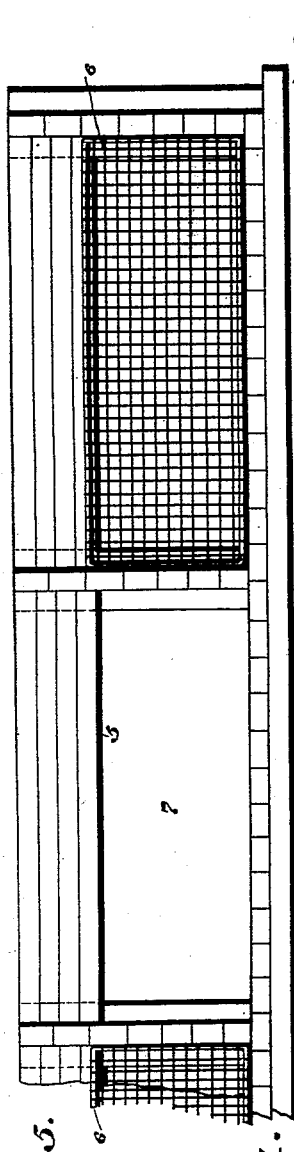
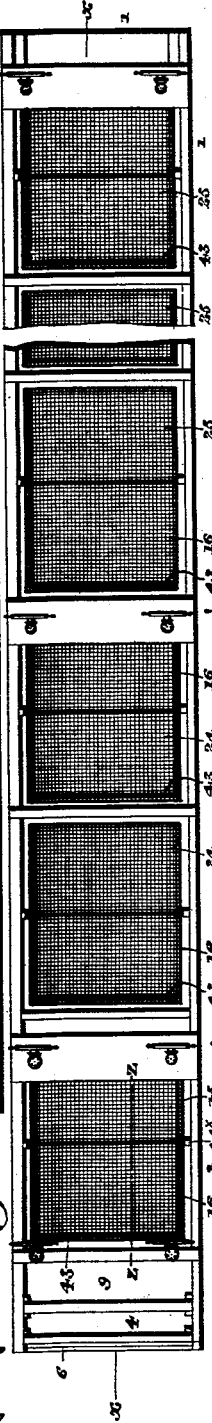
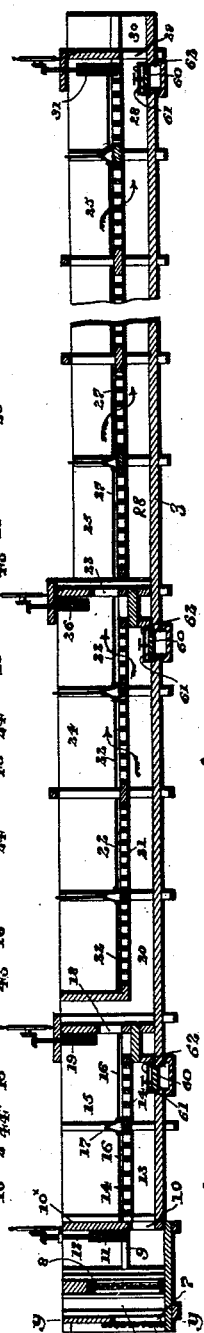
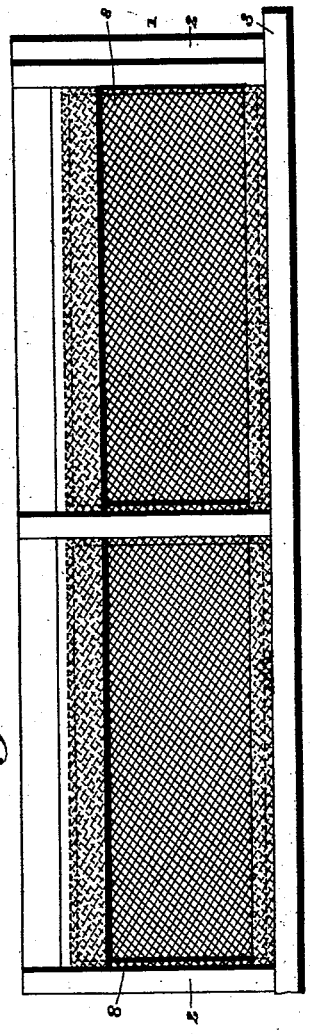
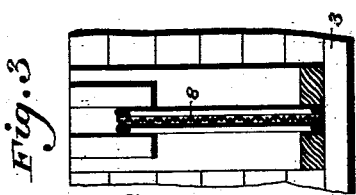
Witnesses
Inventor
George Stites.
By John A. Wiedersheim
Attorney

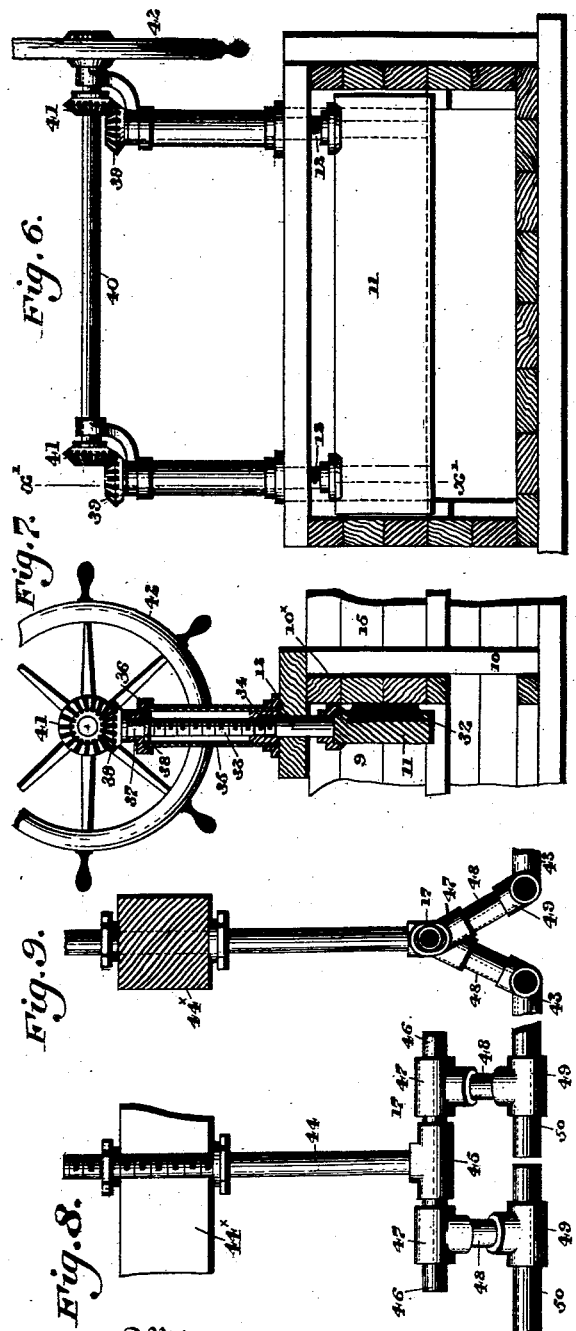

UNITED STATES PATENT OFFICE.

GEORGE STITES, OF PHILADELPHIA, PENNSYLVANIA.

FILTER.

SPECIFICATION forming part of Letters Patent No. 572,136, dated December 1, 1896.

Application filed July 18, 1895. Serial No. 556,345. (No model.)

*To all whom it may concern:*

Be it known that I, GEORGE STITES, a citizen of the United States, residing in the city and county of Philadelphia, State of Pennsylvania, have invented a new and useful Improvement in Filters, which improvement is fully set forth in the following specification and accompanying drawings.

My invention consists of a novel construction of filter which is adapted to be built up in sections, the dimensions of the same being readily increased or diminished according to requirements, provision being made for successively filtering the incoming water and for regulating the flow of said water throughout the different compartments of the filter.

It further consists of a novel manner of constructing and supporting the filtering devices whereby the latter can be readily raised or adjusted so as to be cleaned according to requirements.

It further consists of a novel construction of gate which is especially applicable to the above filter.

It further consists of novel details of construction, all as will be hereinafter set forth.

Figure 1 represents a plan view of a filter embodying my invention. Fig. 2 represents a longitudinal section on line $x\ x$, Fig. 1. Fig. 3 represents a section on line $y\ y$, Fig. 2. Fig. 4 represents a front elevation of Fig. 3. Fig. 5 represents a front elevation of Fig. 2, showing the inlet and the manner of supporting the protecting-grating therein. Fig. 6 represents a front elevation of one of the gates and means for operating the same, the flooring and sides of the filter being shown in section. Fig. 7 represents a section on line $x'\ x'$, Fig. 6, a portion of the figure being shown in elevation. Figs. 8 and 9 represent front and side views of a hinged frame and the manner of supporting the same whereby access is had to the interior of the filter, and the filtering devices therefor can be cleaned. Fig. 10 represents a section on line $z\ z$, Fig. 1, showing the frame for supporting the screens and gratings. Fig. 11 represents a sectional view showing the manner of assembling the filtering-cloths and holding the same in position. Fig. 12 represents a sectional view of a cleaning attachment and a valve therefor.

Similar numerals of reference indicate corresponding parts in the several figures.

Referring to the drawings, 1 designates a filter, the same being composed of the sides 2 and the flooring or base portion 3, the above parts being held together and braced in any suitable or convenient manner. The inlet end of the filter, which in the present instance is at the left in Figs. 1 and 2, has a partition 5 therein, adjacent to which is suitably supported the protection-grating 6, which prevents obstacles of a large or objectionable character from passing through the passage 7 into the chamber 4.

8 designates an arresting-screen which is located adjacent said grating 6, and may be supported in position in any suitable manner, as indicated in Fig. 3. The water after passing through said grating 6 and arresting-screen 8 enters the chamber 9 and passes into the chamber 13 through the opening 10, which latter is controlled by means of the valve 11, which is actuated by the stem 12, as will be hereinafter explained.

From the chamber 13 the water passes upwardly through the wooden grating 14 into the chamber 15, the water being filtered and strained in its upward passage by means of the filtering device 16, which is suitably hinged at 17, while the manner of assembling the filtering-cloths, &c., will be understood from Figs. 8, 9, 10, and 11. The water after passing through the chamber 15 passes on through the opening 18 into the chamber 20, said opening 18 being controlled by means of the valve 19. From the chamber 20 the water passes upward through the filtering device 22, whose construction will be hereinafter explained, into the chamber 24, and thence through the passage 23 into the chamber 25, and from thence through the filtering device 27 into the chamber 28, and then through the passage 29, controlled by the valve 31, into the chamber 30, which may be provided with filtering devices similar to those already described, or may lead into a suitable reservoir, if desired.

It will be noticed that the chamber 24 is twice the area of chamber 15, and that the chamber 25 is three times the area of the chamber 15, the next chamber or chambers in the series increasing in a proportionate ratio as required, whereby the greater quantity of water in the filter is in a condition for use, and is less stirred or agitated by the filtration in the inlet end of the same. It will furthermore be evident that instead of one series of compartments, as shown in Fig. 1, two or more may be placed side by side, as indicated in Figs. 4 and 5, the number of compartments being increased or diminished according to requirements.

The mechanism for actuating the valves and the construction of the latter will now be described, it being understood that all the valves or gates 11, 19, 26, and 31 are substantially the same, and therefore the description of one will suffice for all. The said gate 11 is provided with a facing of hard rubber 32, which is wedged or otherwise secured into said gate and has its bearing upon the seat or partition 10×, which in the present instance separates the chambers 9 and 15, and said gate 11 has suitably attached thereto the hollow tube 12, to which is secured a nut 34, the threaded stem 33 engaging said nut and being adapted to work freely in said hollow tube 12, said stem being inclosed by the casing 35, which is sustained above the gate upon any suitable support.

36 designates a cap mounted on said casing 35 and having the neck 37 passing freely therethrough, said stem 33 being prevented from upward movement by the engagement of the shoulder 38 with the under side of said cap 36.

39 designates a bevel-gear which is mounted on the top of said stem 33, and is engaged by a similar gear 41, mounted on the shaft 40, which latter may be actuated by any suitable means, as by a wheel 42, the preferred construction being seen in Fig. 6, in which each end of the gate is provided with a threaded stem and means for actuating the same so that the ends of said gate will be simultaneously raised.

In Figs. 8, 9, 10, and 11 are shown detail views of the filtering devices and means for obtaining ready access to the same and to the interior of the filter and for removing the filtering-cloths when desired.

44 designates a rod or tube which passes up through the beam 44×, the lower portion of said rod 44 having attached thereto a T 45, from which extend in either direction the nipples 46, each of said nipples having an engagement therewith, the T's 47, to which are secured the nipples 48, which engage the other T's 49, the latter having attached thereto the portions 50 of the frame 16, which is made of pipe or tubing, as will be understood from Fig. 10, said frame having the end portions 43 and being of a rectangular or other shape, and having the screen 43× extending between the walls of said frame.

In Fig. 11 is shown one manner of holding the filtering-cloths in position, 14 designating a wooden grating, as before, while 51 designates said filtering-cloths, the latter being placed, as seen in said figure, so that their points of junction will overlap, the same being held in position by means of the bar 52, of wood or other material, which is supported across the laps, one end being secured in one of the partitions, while its other end is clamped down to hold the filtering-cloths in the desired position. It will be noted that in the compartments 15 and 24 the water passes upwardly from said chamber through said grating, while from the chamber 27 it passes downwardly, and to provide for this provision is made, as will be explained.

In Fig. 1 the screws at the end of the gates are shown as being operated each by a separate hand-wheel, and in Fig. 6 as operated simultaneously.

It will be understood, further, that as many gates may be employed in each compartment as may be desired.

The manner of assembling the filtering devices is preferably the following: In the first section, upon the top of the wood grating 14, is placed a light wire grating, then one layer of coarse filtering-cloth, and then upon the whole the frame 16, formed of the section of tubing and the wire screen 43×, is placed, thus holding the lower filtering-cloth and the screen in place, the said frame being readily raised or lowered, as will be understood from Figs. 8, 9, and 10. In the second section 24 a light wire grating is laid upon the wood grating, then one or more layers of finer filtering-cloth, and then upon the whole is placed the hinged frame, as seen at the right of Fig. 10. In the third section 25 the hinged frames shown in Fig. 10 may be omitted, if desired, and in place of the same only fine filtering-cloths employed, as shown in Fig. 11, the same being placed upon the grating 14 with or without an interposed screen, and being overlapped and held in position, as seen in said Fig. 11.

When it is desired to clean the filter, the device shown in Fig. 12 is employed, 60 designating a trough or channel under each compartment, the entrance to each being controlled by the valve 61, which has a stem passing through the yoke 62, by which said valve is moved toward or away from its seat, said channels 60 being in communication with each other and leading to a sewer or other conduit, the whole apparatus being thus readily cleansed or flushed when desired by opening said valves 61, while access can be had to the interior by raising the hinged frames, it being further evident that when it is desired to use the latter in the compartment 25 the filtering-cloths are placed upon the hinged frames, as seen to the left of Fig. 10, while in the compartments 15 and 24 the hinged frames are placed over said filtering-cloths, as seen in Fig. 10 at the right. When said frames are not employed, the filtering-cloths are placed as seen in Fig. 11.

The operation is as follows: The water after passing through the protection-grating 6 and the arresting-strainers 8 passes into the chamber 9, and thence in succession into the chambers 13, 15, 20, 24, 25, and 28, it being successively filtered as it passes through the screens and cloths, as has been explained, and when it is desired to clean the apparatus or to remove the material strained from the water it is only necessary to lift the iron frame 43, the same swinging readily on the joint 17, as will be evident, and access can then be readily had to the interior at all times, the manner of flushing or cleaning out the sediment from the floor of the device having already been described.

Every part of the filter is readily accessible and the dimensions of the same can be increased or diminished according to requirements, and in case of injury or damage to any of the parts the same can be readily replaced, as is evident.

By having the successive chambers of increased size and the straining-cloths of increased fineness the coarser matter is separated at the entrance of the filter and each successive filtration is of the finer particles, and generally of less matter.

Having thus described my invention, what I claim as new, and desire to secure by Letters Patent, is—

1. A filter having a protection-grating at its inlet, an arresting-screen adjacent said grating, and provided with series of upper and lower chambers of increasing dimensions, movable frames suitably supported in each of said chambers, filtering devices mounted upon said frames, dividing-gates for said chambers, and separate discharge-valves for each of said lower chambers, each of the chambers of each series communicating with a chamber of the other series, said parts being combined substantially as described.

2. A filter, having suitable sides and flooring, a protection-grating, an arresting-screen, a series of compartments, in communication therewith of increasing diameter, a grating in each of said compartments, screens and filtering-cloths supported upon said grating and hinged frames having wire gratings or screens attached thereto, for holding said cloths in position, substantially as described.

3. In a filter, a protection-grating, an arresting-strainer, a series of valved compartments, gratings thereon, hinged frames over said gratings, filtering devices supported upon said frames, in combination with means for cleansing said compartments, substantially as described.

4. In a filter, suitable gratings, the supporting-rod 44, the connections 48, pivotally mounted thereupon, the frame 43, attached to said connections, in combination with wire screens mounted on said frame, and cloth interposed between said screens, substantially as described.

5. In a filter, the rod 44, the nipples 46, connected with said rod, the T's 47 connected with said nipples 46, the nipples 48 secured to said T's 47, and the frames 16 attached by the T's 49 with said nipples 48 and provided with the screen 43$^\times$ between the walls thereof, said parts being combined, substantially as described.

6. A filter consisting of upper and lower chambers arranged in pairs of increasing dimensions from the inlet thereof, and the communication between the adjacent chambers of the upper and lower chambers respectively, having filtering-cloths of different degrees of fineness, the coarsest cloth being between the smaller chambers and the finest cloths between the largest chambers, substantially as and for the purpose described.

GEORGE STITES.

Witnesses:
JOHN A. WIEDERSHEIM,
E. HAYWARD FAIRBANKS.